May 13, 1941.  D. H. TAYLOR  2,241,679
ROPE PULLING AND HOLDING DEVICE
Filed Feb. 6, 1939
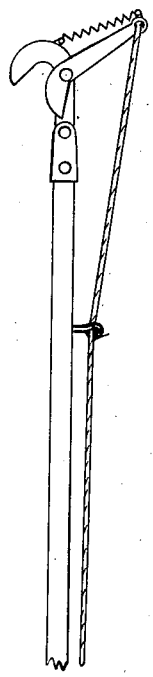
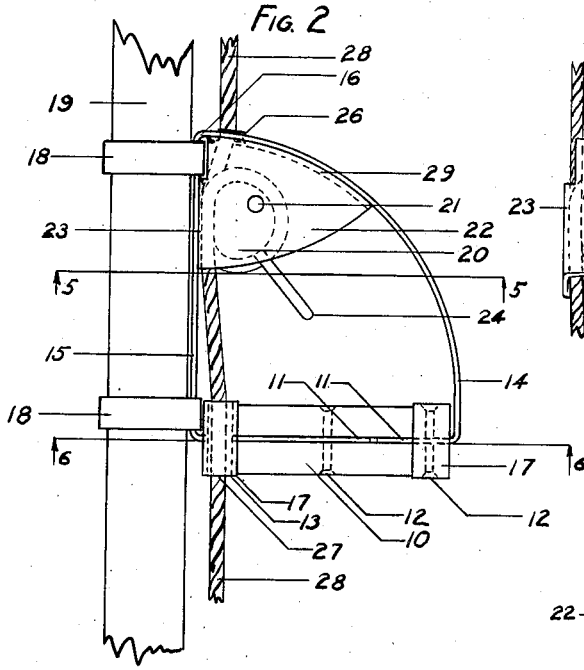
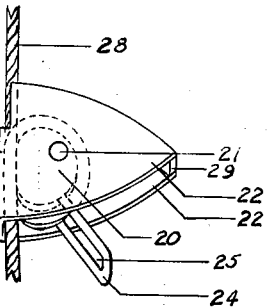
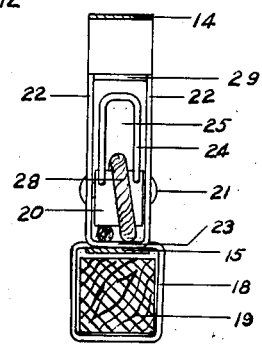
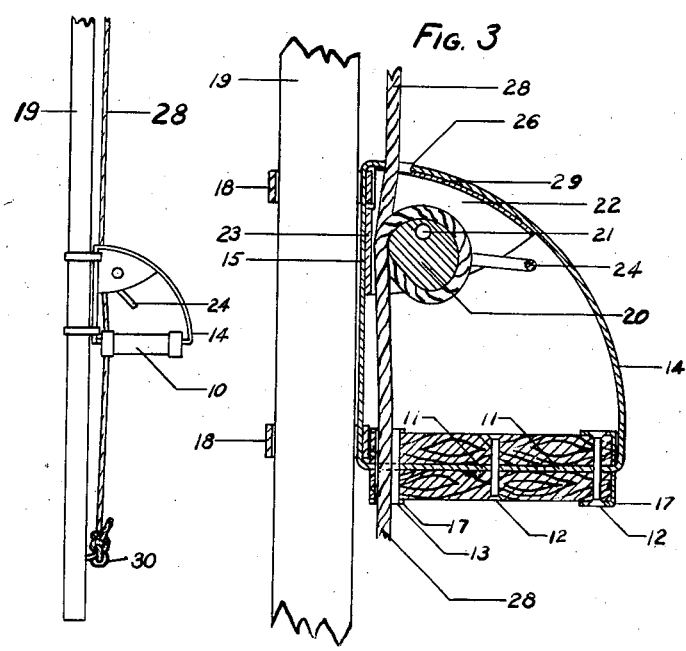
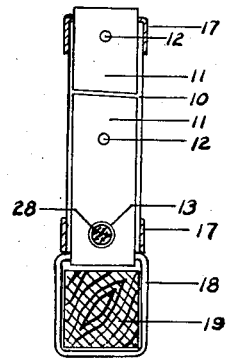
INVENTOR
Daniel H. Taylor

Patented May 13, 1941

2,241,679

UNITED STATES PATENT OFFICE 2,241,679

ROPE PULLING AND HOLDING DEVICE

Daniel H. Taylor, Los Angeles, Calif., assignor to H. K. Porter, Inc., Everett, Mass., a corporation of Massachusetts Application February 6, 1939, Serial No. 254,894

14 Claims. (Cl. 74—502)

This invention relates to a device for pulling on a small rope or the like and for holding the same, and more particularly when said device is used in cooperation with a long shaft or handle supporting on an end thereof a head mechanism operated by a pull of the rope, such, for example, as the so-called tree trimmer or pole pruner such as has been illustrated in the accompanying drawing, and will be described in the following specification by way of example.

When more than casual use is made of a tree pruner of the kind referred to, the workman, because he must grasp a bare small rope or wind the same about his hand for a pulling operation, quickly experiences hand fatigue to the point of injury, and the amount of work which he can do is greatly limited. Furthermore, it is necessary to use both hands to direct and position the tool for the succeeding cut, and while in theory the workman might keep the rope constantly in hand while doing this, in practice this is hardly feasible and the rope continually gets away from him with a resultant loss in time in reaching for it. My purpose, therefore, is to provide in a tool of this class a hand grip which may be constantly held in the hand and which will be of use to the operator in positioning the tool as a whole and which may be utilized without a re-positioning of the grasping hand for pulling on the operating rope to operate the cutter head, and furthermore, since a tree pruner of the class described is utilized for cutting limbs at various distances from the operator, one which is readily adjustable at the desired position along the rope. Moreover, in attaining such results I have provided a device which embodies a rope-clamping means which, as distinguished from certain rope clamps of the prior art with which I am familiar and which utilize abrupt projections, teeth or otherwise roughened rope-clamping means which I have found very destructive to the rope fabric when utilized for my intended purpose because of the frequent releasing and re-clamping of the same, will be easy on the rope and permit the same to wear for a long while.

Having thus briefly but not exhaustively referred to the conditions under which my invention is adapted to operate, the invention will be more fully understood by reference to the following description taken in connection with the accompanying drawing, wherein:

Fig. 1 is a broken side elevation of a pole pruner illustrative of the invention;

Fig. 2 is a fragmentary view on a larger scale showing a portion of the pole or staff of the pruner and the operating rope with the rope-pulling and holding device, the latter being shown in rope-clamping position;

Fig. 3 is a similar view in vertical section, the rope-holding device being shown in released position;

Fig. 4 is a perspective of the rope-clamping mechanism proper;

Fig. 5 is a section on the line 5—5 of Fig. 2; and

Fig. 6 is a section on the line 6—6 of Fig. 2.

Referring to the drawing, I there show a pole pruner of conventional type having a pole or shaft 19 carrying the pruner head adapted to be actuated by the depending rope 28 which is here shown as secured adjacent the lower end of the shaft at the point 30. The manipulating and head-operating device herein shown is mounted to slide vertically along the shaft and in the embodiment shown comprises the pair of spaced bands 18 encircling the shaft which carry a generally sector-shaped framework formed of a metal strip having a vertical portion 15 extending between the bands and an outwardly and downwardly curved arcuate portion 14 extending from the upper extremity 16 of the vertical portion 15, the lower ends of the parts 14 and 15 having inwardly turned end portions 11 on which is mounted a hand grip 10 secured thereto by rivets 12 and a hollow rivet 13, the latter for a purpose hereafter to be more fully described. I have also shown the grip 10 as provided with reinforcing ferrules 17 at its ends. The grip 10 as regards the frame above referred to is somewhat analogous in position and function to the grip member of a D handle shovel, and as regards the shaft or pole 19 somewhat analogous to the nib of a scythe snathe.

I have herein shown mounted at the upper end of the frame a casing comprising a web portion 23 adapted to rest against and be secured to the portion 15 of the frame and side plates 22 secured to a spacing member 29 resting against and secured to the upper portion of the arcuate member 14. The side plates 22 provide bearings for a shaft 21 on which is mounted a roller-like gripping cam or eccentric 20 having a rise portion opposing the web 23 to form a clamp for the rope, as will be hereinafter described, this rise portion, when in the clamping portion of rotative adjustment of the cam as shown in Fig. 2, having a rectilinear extension which then substantially parallels the opposed abutment 23. The rope 28 enters the casing through an opening 26, passes between the cam 20 and the abutment 23 and leaves through a guide provided by the hollow rivet 13 previously referred to (see Fig. 3).

The cam 21 and the opposing abutment are of such width of face as to permit the rope to be given a complete round turn about the same, as shown in Fig. 3, so that portions of the rope leading respectively to the stretch above the frame which is secured to the cutter head and the stretch below the frame which is secured at 30 (the hauling part) are disposed side by side between the clamping surfaces. To maintain the rope on the cam, the rear of the cam may be provided with a guide in the position of a loop or bail 24 (see Fig. 5) presenting an opening 25 receiving the rope and holding it centrally of the flat face of the cam. This bail 24 projects outwardly below the edges of the side plates 22, as seen in Fig. 2, and constitutes a finger lever by means of which the cam may be manually rocked from the clamping position of Fig. 2 to the released position of Fig. 3 when desired. The inner wall of the arcuate member 14 serves as a stop limiting counterclockwise movement of this lever.

In operating the tool the staff or pole 19 is grasped with, say, the left hand and the grip 10 with the right hand which assists the left hand in supporting the long, relatively unwieldy tool and positioning the head at the desired point of cut. Assuming that the grip 10 is, when this operation is completed, located at an easy arm's length from the operator, he merely pulls down on the grip without releasing his hand, the bands 18 sliding along shaft 19. The rope is securely clamped by the cam 20, the resistance of the cut tending to rock it clockwise viewing Fig. 2 to clamping position, and the head is thereby operated. The cutter jaw of the tool is usually returned to open position by a spring and, if the hand is permitted to move idly with the rope as it is drawn upwardly by this spring, the tension of the spring maintains the parts clamped and the device returns to its initial position. If, however, it is desired to shift the position of the device on the rope to a more convenient one, an upward movement of the hand will advance the device upwardly not only along the shaft but along the rope since the latter, being secured at 30, will rock the cam counterclockwise in the manner indicated in Fig. 2, releasing the grip and permitting the rope to run around the cam because of the roller-like form of the latter, this action being automatic and effected without the hand releasing the grip 10. It will be understood, however, that if it is desired in some cases initially to shift the pulling device downwardly, the cam may be released by moving the finger lever 24 counterclockwise. The cam thus operates as a one-way clutch device permitting free movement of the device upwardly along the rope to position the same when desired but snubbing the rope securely for a downward pull to operate the cutter head. The arrangement of the rope with a complete round turn about the cam particularly facilitates this operation as it provides an effective driving connection to the cam in either direction and a more secure grip on the pulling stroke since a clamping force applied to the downwardly extending leg of the round turn is enormously more effective than a similar force applied directly to the portion of the rope depending from the cutter head.

I claim:

1. A portable tool having a long shaft and a head mechanism at an end thereof adapted to be actuated by a pull, a flexible connector extending from the head, a member through which the connector is threaded presenting a hand grip, and means associated with said member for automatically gripping the connector on a downward pull, said means releasing automatically on simple upward movement given to the member by the hand grip to permit the member to be repositioned upwardly along the connector.

2. A portable tool having a long shaft and a head mechanism at an end thereof adapted to be operated by a pull, a flexible connector extending from the head, a member slidably mounted on the shaft through which the connector is threaded and presenting a laterally extending hand grip, and gripping means associated with said member for coupling the same to the connector at selected positions along the length thereof.

3. A portable tool having a long shaft and a head mechanism at an end thereof adapted to be operated by a pull, a flexible connector extending from the head, a member slidably mounted on the shaft through which the connector is threaded and presenting a laterally extending hand grip, and means associated with said member for automatically gripping the connector on a downward pull, said means releasing automatically on simple upward movement given to the member by the hand grip to permit the member to be repositioned upwardly along the connector.

4. A device for engaging and hauling on an extended length of rope comprising a member slidable along the rope and presenting an abutment surface thereto, and a rotatably and eccentrically mounted roller-like device of sufficient width to receive thereabout a round turn of the rope and having a rise portion to press at least the branch of the round turn which leads to the hauling end of the rope against said abutment, said member having a hand grip for reciprocating the same along the rope.

5. A device for engaging and hauling on an extended length of rope comprising a member slidable along the rope and presenting an abutment surface thereto, an eccentric device to receive thereabout a round turn of the rope and having a rise portion to press at least the branch of the round turn which leads to the hauling end of the rope against said abutment, said member having a hand grip for reciprocating the same and having associated therewith means for slidably mounting it on an elongated shaft or pole.

6. A device for engaging and hauling on an extended length of rope comprising a member slidable along the rope and presenting an extended abutment surface to the side of the rope, an eccentric device to receive thereabout a round turn of the rope and having a rise portion to press at least the branch of the round turn which leads to the hauling end of the rope against said abutment, said rise portion being extended in a substantially straight line which in the gripping position of the eccentric substantially parallels said abutment surface, said member having a hand grip for reciprocating the same and having associated therewith means for slidably mounting it on an elongated shaft or pole extending substantially parallel to said abutment surface.

7. A device for engaging and hauling on an extended length of rope comprising a member slidable along the rope and presenting an extended abutment surface to the side of the rope, an eccentric device to receive thereabout a round turn of the rope and having a rise portion to press at least the branch of the round turn which leads to the hauling end of the rope against said abutment, said rise portion being extended in a substantially straight line which in the gripping position of the eccentric substantially parallels said abutment surface, said member having a hand grip for reciprocating the same along the rope.

8. A device of the class described comprising a member through which a rope is reeved presenting an abutment surface to the side of the rope, an eccentric member opposing the surface for receiving thereabout a round turn of the rope having a rise portion to press at least the branch of the round turn which leads to the hauling part against the surface and having an arm extending therefrom at a point generally opposite to said rise portion apertured to pass the rope, said arm serving to maintain the rope in position about the eccentric and providing a manipulating lever therefor.

9. A device of the class described comprising a generally sector-shaped frame having along a side thereof means for slidably securing it to the side on an elongated shaft, the intersecting side being formed as a hand grip which will extend laterally from such shaft, the frame having apertures to guide a rope therethrough to lie along said first side, side plates spanning the frame remote from the handle and an eccentric pivoted between said side plates responsive to tension on the rope and cooperating with said first side to grip the rope when the device is pulled in one direction therealong.

10. A device of the class described comprising a generally sector-shaped frame having along a side thereof means for slidably securing it to the side on an elongated shaft, the intersecting side being formed as a hand grip which will extend laterally from such shaft, the frame having apertures to guide a rope therethrough to lie along said first side, side plates spanning the frame remote from the handle and an eccentric pivoted between said side plates responsive to tension on the rope and cooperating with said first side to grip the rope when the device is pulled in one direction therealong, and a finger lever attached to said eccentric projecting beyond the plates and opposing the inner surface of the frame which thus provides a stop for the lever.

11. A device of the class described comprising guiding means for cooperation with an elongated shaft whereby the device may be slidably mounted thereon, a handle rigidly related to said guiding means whereby it may be utilized in positioning such a shaft, said device presenting an abutment along which a rope may extend and a clamping member opposing said abutment whereby the rope may be clamped at selected positions along its length, and a finger piece independent of said handle for manipulating the clamping member.

12. A device of the class described comprising guiding means for cooperation with an elongated shaft whereby the device may be slidably mounted thereon, a handle rigidly related to said guiding means whereby it may be utilized in positioning such a shaft, said device presenting an abutment along which a rope may extend and a clamping member opposing said abutment whereby the rope may be clamped at selected positions along its length, said clamping device being normally responsive to draft of the rope in one direction to move to clamping position, and a finger piece independent of said handle for manipulating the clamping member.

13. A portable tool having a long shaft and a head mechanism at the end thereof adapted to be actuated by a pull, a flexible connector extending from the head, a member slidable along the shaft and presenting a hand grip whereby it may be utilized as a means for positioning the shaft, the connector being threaded through said member and secured at its lower end to the shaft, and gripping means carried by the member for cooperation with the connector so threaded and normally positioned to permit the member to run freely upwardly along the connector toward the head and having alternative positions for clamping the connector or releasing the same on downward movement selectively assumed under control of the grasping hand on said member whereby down draft on the member may be rendered effective as a pull on the connector at a selected point therealong.

14. A portable tool having a long shaft and a head mechanism at the end thereof adapted to be actuated by a pull, a flexible connector extending from the head, a member slidable along the shaft and presenting a hand grip whereby it may be utilized as a means for positioning the shaft, the connector being threaded through said member and secured at its lower end to the shaft, said member being slidable along the bight of the connector and gripping means associated with said member operative without release of the grasping hands from the member and shaft respectively for selectively coupling the member to the connector at selected positions along the length of the latter to permit exertion of downdraft on the connector through the member.

DANIEL H. TAYLOR.